United States Patent [19]
de Veer

[11] 3,904,267
[45] Sept. 9, 1975

[54] COMPENSATING PLATE TO PROVIDE UNIFORMITY IN INTERFERENCE MICROSCOPES
[75] Inventor: Johannes D. de Veer, Harvard, Mass.
[73] Assignee: American Optical Corporation, Southbridge, Mass.
[22] Filed: July 2, 1973
[21] Appl. No.: 376,074

[52] U.S. Cl. .................................. 350/12
[51] Int. Cl.² ........................... G02B 21/06
[58] Field of Search .............. 350/12, 13, 14, 15

[56] References Cited
UNITED STATES PATENTS
2,601,175  6/1952  Smith .......................... 350/12
2,924,142  2/1960  Nomarski ..................... 350/13
FOREIGN PATENTS OR APPLICATIONS
856,621  12/1960  United Kingdom ............ 350/15

Primary Examiner—Vincent P. McGraw
Assistant Examiner—F. L. Evans
Attorney, Agent, or Firm—Alan H. Spencer; William C. Nealon; H. R. Berkenstock, Jr.

[57] ABSTRACT

Lack of uniformity in polarizing microscopes is caused by hyperbolae resulting in a cross-like distribution in the objective pupil of the instrument which results from rotation of the directions of polarization. A similar phenomena exists in differential interference contrast microscopes caused by small unwanted phase differences when the prisms are not perpendicularly traversed by the light. A birefringent compensating plate corrects the unwanted phase differences in selected areas of the field of a differential interference contrast microscope and, in combination with a quarter wavelength retardation plate, rotates the direction of polarization in selected areas of the objective pupil of a polarizing microscope to provide uniform pupil.

5 Claims, 8 Drawing Figures

COMPENSATING PLATE TO PROVIDE UNIFORMITY IN INTERFERENCE MICROSCOPES

BACKGROUND OF THE INVENTION

A polarizing microscope having the polarizer and analyzer set at 90° to each other exhibits a cross similar to that shown in FIG. 1 in the pupil of the objective. When the analyzer is rotated very slightly, two hyperbolae are visible as shown in FIG. 2. A similar problem arises in the field of a differential interference contrast microscope, hereinafter DIC. In the DIC microscope, that light which traverses a Wollaston prism obliquely to the optical path has variations in the phase difference producing a lack of uniformity in the field.

DESCRIPTION OF THE INVENTION

Figure 3:
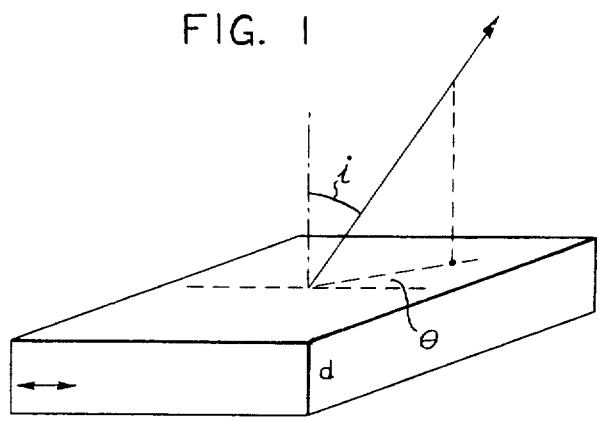
FIG. 3 is an optical diagram of a light ray passing through a representative Wollaston prism obliquely to the entrance and exit surfaces.

A Wollaston prism in a DIC microscope may be considered a plane parallel plate for explanation of the phase principles involved herein. For purposes of this disclosure, the term "birefringent element" includes either the beamsplitter or compensator of a DIC microscope. FIG. 3 represents such a plate having the path difference ($\Delta_{e-o}$) between the ordinary ray vibration ($o$) and the extraordinary ray vibration ($e$) as approximately $$\Delta_{e-o} = (n_e - n_o)d - \frac{n_e - n_o}{2n^2} \cos 2\theta \times d \times i^2,$$

where $$n = \frac{n_e + n_o}{2}.$$

Figure 1:
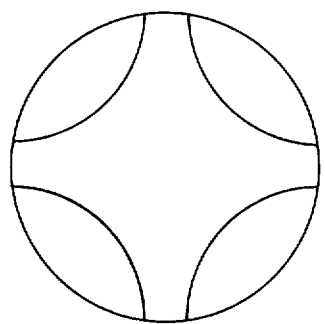
FIG. 1 illustrates the polarization cross appearing in the pupil of the objective of a polarizing microscope or the field of a DIC microscope.
Figure 4:
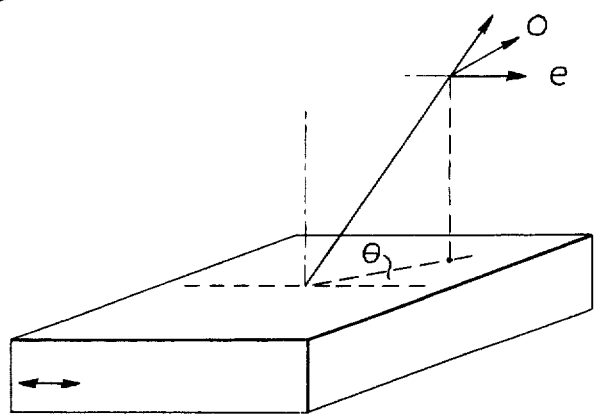
FIG. 4 is an optical diagram illustrating the axes of vibration for the ordinary and extraordinary rays of a light ray passing obliquely through a Wollaston prism.

The artifact of FIG. 1 arises from the $$\frac{n_e - n_o}{2n^2} \cos 2\theta \times d \times i^2$$

portion of the equation. FIG. 4 illustrates the axes of vibration for the ordinary (o) and extraordinary (e) rays in a crystal having an optic axis perpendicular or near perpendicular to the optical axis of the instrument. When angle i is small, the e- and o-vibration are approximately parallel with, and perpendicular to, the optic axis, respectively, independent of angle $\theta$.

The present invention relates to compensation of changes in the path difference ($\Delta_{e-o}$) between the ordinary and extraordinary vibrations caused by changes in $\theta$ and i. A birefringent compensating plate having its optic axis substantially parallel to the optical axis of the DIC microscope is used to correct for $\Delta_{e-o}$. The birefringent plate may be of the same or different sign of birefringence as the birefringent element. When the sign of birefringence is different, a half wave plate must be added to the system between the birefringent element and the compensating plate. Most uniaxial birefringent materials may be used, including magnesium fluoride, sapphire, calcite, and the like excluding quartz and similar materials having rotatory power. Magnesium fluoride is a preferred birefringent material and is used in the embodiments described hereinafter.

Figure 5:
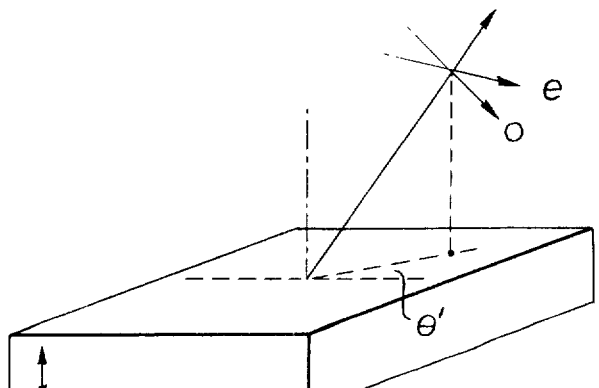
FIG. 5 is an optical diagram showing the axes of vibration of the ordinary and extraordinary ray passing obliquely through a magnesium fluoride crystal plate.

Referring to FIG. 5, a magnesium fluoride crystal is shown having an optic axis parallel to the optical axis of the instrument. The path difference $\Delta'_{e-o}$ approximately equals $$\frac{n'_e - n'_o}{n'^2} \times d' \times i'^2.$$

Figure 6:
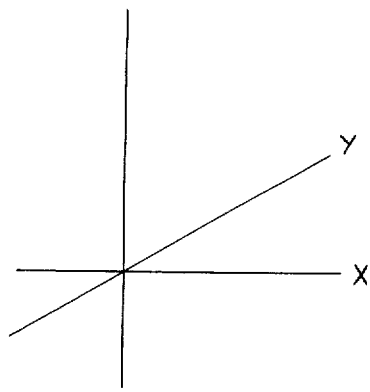
FIG. 6 illustrates the reference orientation of the $x$ and $y$ axes for FIGS. 3–5.

The direction of the e- and o-vibrations are in a plane normal to the ray. The e-vibration of the ray through the magnesium fluoride crystal makes an angle $\theta$ with the e-vibration of the ray through the element of FIG. 3. Using the orientation of FIG. 6, the path difference between the $x$-and $y$-vibrations may be expressed for the element of FIG. 3 as $$\Delta_{x-y} = (n_e - n_o)d - \frac{n_e - n_o}{2n^2} \times \cos 2\theta \times d \times i^2 \qquad (1).$$

and for the magnesium fluoride plate as $$\Delta'_{x-y} = \frac{n'_e - n'_o}{n'^2} \times \cos 2\theta \times d' \times i'^2 \qquad (II).$$

The term $(n_e-n_o)d$ is cancelled by the other birefringent element of the DIC microscope and can therefore be ignored. Compensation ($\Delta_{x-y} = -\Delta'_{x-y}$) is obtained by selecting the proper thickness $d'$. When (I) and (II) are combined, compensation ($\Delta_{x-y} + \Delta'_{x-y} = 0$) is obtained if $$\frac{n_e - n_o}{2n^2} \times d \times i^2$$

is equal to $$\frac{n'_e - n'_o}{n'^2} \times d' \times i'^2.$$

Thus, compensation can be obtained by selecting a proper thickness $d'$ for the compensating plate, if $i$ is proportional to $i'$. If the birefringent element and the magnesium fluoride compensating plate are optically superimposed or immediately adjacent, then $= i'$. A quartz birefringent element is compensated when $d'= 0.31d$. The term d refers to the total thickness of the element or elements for which compensation is desired by a single compensating plate. For example, a single compensating plate may be used in an incident light microscope to accomodate phase changes arising through both traversals of the birefringent element by using as $d$ a value equal to two times the actual thickness of the birefringent element.

The compensating plate may be placed in any position between the polarizer and analyzer where $i$ is proportional to $i'$, for example either above the objective or below the condenser of the DIC microscope. Also, a compensating plate may be used in each position. The compensating plate should either have entrance and exit surfaces normal to the optical axis of the instrument, or, if tilted slightly to reduce stray light, etc., should have the optic axis rotated to remain optically parallel to the optical axis of the instrument. Optical systems for DIC microscopes in which the present invention is useful are exemplified in U.S. Pat., Nos. 2,601,175; 2,924,142 and my co-pending application, Ser. No. 324,456, filed Jan. 16, 1973 now U.S. Pat. No. 3,868,168.

Incident light microscopes commonly use a common birefringent element as both the beamsplitter and compensator. In such an instrument, a quartz birefringent element of the Wollaston type with an actual thickness of 1.5 millimeters is considered to have a total thickness of three milimeters for purposes of compensation by a single compensating plate. The compensating plate may be placed between the light source and the beamsplitter, or between the beamsplitter and the eyepiece. In either position, compensation can be obtained in the instrument by using a magnesium fluoride crystal plate having a thickness along the optical axis of 0.90 millimeters and the optic axis of the plate being substantially parallel to the optical axis of the instrument. Round compensating plates are frequently used instead of rectangular plates as shown in the drawings because of the convenience of mounting the same in conventional microscopes. It is also contemplated that oval plates may be used when the compensating plate is tilted with respect to the optical axis of the system.

Figure 2:
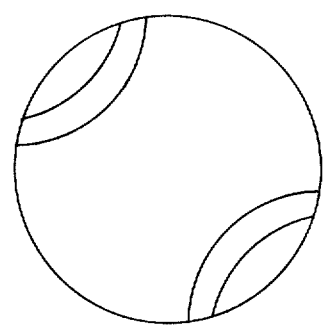
FIG. 2 represents the lack of uniformity appearing in the pupil of an objective in a polarizing microscope when the polarizer and analyzer are near, but not at 90°.
Figure 7:
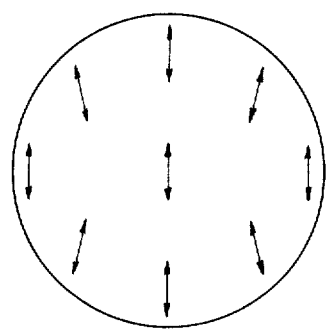
FIG. 7 shows the directions of polarization at the exit pupil of a polarizing microscope objective.
Figure 8:
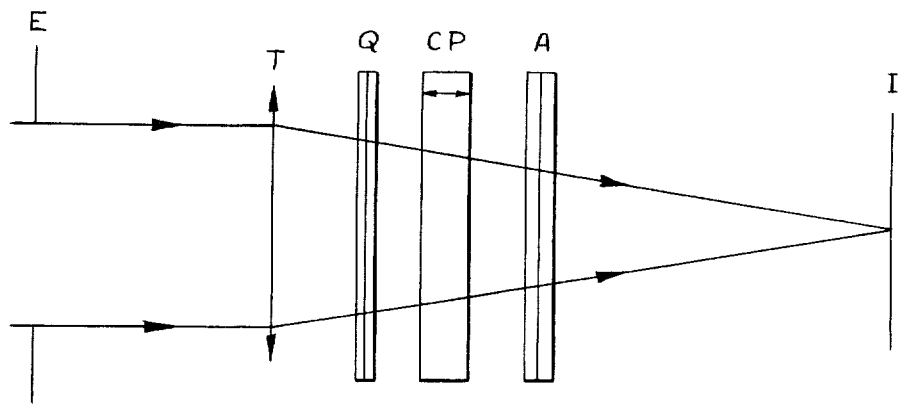
FIG. 8 shows an optical diagram of a compensating plate and quarter-wave plate in a polarizing microscope.

In a polarizing microscope, the lack of uniformity illustrated in FIGS. 1 and 2, is caused by rotation of the direction of polarization in certain areas in the exit pupil of the microscope objective. Many commercial polarizing microscopes also exhibit phase differences caused by lens coatings, which result in ellipticity in addition to rotation. FIG. 7 illustrates representative directions of polarization at the exit pupil of a microscope objective prior to compensation. FIG. 8 is an optical diagram of a portion of a polarizing microscope having an exit pupil E, a telescope lens T, a quarter wave plate Q, a compensating plate CP, a polarization analyzer A, and an image plane I. Compensating plate CP produces elliptically polarized light as a function of the angle of incidence of the polarized light. In combination with quarter wave plate Q, linearly polarized light is produced but rotated as a function of incident angle by the compensating plate CP. This rotation corrects the undesired rotation of the direction of polarization at the exit pupil E of the microscope objective providing a uniform exit pupil.

Additional phase differences caused by lens coatings are corrected by selection of a phase retardation deviating from 90° to accommodate these additional phase differences.

The foregoing description of an embodiment of this invention is given by way of illustration and not of limitation. the concept and scope of the invention are limited only by the following claims and equivalents thereof which may occur to others skilled in the art.

1. In a differential interference contrast microscope having at least one birefringent element, the improvement comprising a compensating plate comprising a birefringent material having an optic axis substantially parallel to the optical axis of the instrument, said compensating plate having a thickness effective to correct phase variations in the microscope field.

2. The improvement of claim 1 wherein the compensating plate is a magnesium fluoride crystal, wherein the birefringent material is quartz.

3. The improvement of claim 1 wherein the compensating plate is a magnesium fluoride crystal.

4. The improvement of claim 1 wherein said microscope is an incident light differential interference contrast microscope said birefringent element is quartz, having an actual thickness of 1.5 millimeters and said magnesium fluoride plate has a thickness of 0.9 millimeters to compensate for both light traversals of said birefringent element.

5. The combination of claim 4 wherein said birefringent element and compensating plate have the same incident light angle.

* * * * *